United States Patent [19]
Faitel

[11] Patent Number: 5,819,395
[45] Date of Patent: Oct. 13, 1998

[54] MACHINE TOOL MODULE WITH CUTTING TOOL AND SUPERIMPOSED WORKPIECE-CARRYING PLATEN

[75] Inventor: William M. Faitel, Oxford, Mich.

[73] Assignee: Western Atlas, Inc., Hebron, Ky.

[21] Appl. No.: 705,182

[22] Filed: Aug. 29, 1996

[51] Int. Cl.$^6$ .................................................. B23P 23/00
[52] U.S. Cl. ........................... 29/564; 29/33 P; 29/56.6; 29/563; 409/158; 409/164
[58] Field of Search .................. 290/564, 56.5, 290/56.6, 33 P, 563; 409/145, 158, 163, 164, 181

[56] References Cited

U.S. PATENT DOCUMENTS

| | | |
|---|---|---|
| 1,047,493 | 12/1912 | Bryant . |
| 2,164,616 | 7/1939 | Manny ........................................ 29/564 |
| 3,270,415 | 9/1966 | Lakatos ...................................... 29/564 |
| 3,954,044 | 5/1976 | Ridgway .................................. 409/163 |
| 4,133,423 | 1/1979 | Zankl ........................................ 198/339 |
| 4,212,572 | 7/1980 | Vu-Do ........................................ 409/37 |
| 4,401,400 | 8/1983 | Stark .......................................... 408/71 |
| 4,460,081 | 7/1984 | Stark et al. ............................... 198/341 |
| 4,563,115 | 1/1986 | Abe et al. ................................. 409/134 |
| 4,564,995 | 1/1986 | Kase .......................................... 29/564 |
| 4,612,690 | 9/1986 | Baker ...................................... 29/33 P |
| 4,679,606 | 7/1987 | Bassett ..................................... 144/134 |
| 4,738,571 | 4/1988 | Olson et al. .............................. 409/137 |
| 4,830,554 | 5/1989 | Lopez ....................................... 409/164 |
| 4,881,585 | 11/1989 | Bergler ...................................... 144/134 |
| 4,970,765 | 11/1990 | Sakawa et al. ............................... 29/33 |
| 4,976,025 | 12/1990 | Aldridge, Jr. et al. ................... 29/33 P |
| 5,067,229 | 11/1991 | Nakamura ................................ 409/191 |
| 5,238,339 | 8/1993 | Beer ......................................... 409/191 |
| 5,243,745 | 9/1993 | Varnau ..................................... 29/33 P |
| 5,249,896 | 10/1993 | Namba et al. ........................... 409/191 |
| 5,284,407 | 2/1994 | Wawrzyniak ............................ 409/132 |
| 5,379,510 | 1/1995 | Berge ....................................... 409/163 |

*Primary Examiner*—A. L. Pitts
*Assistant Examiner*—Christopher Kirkman
*Attorney, Agent, or Firm*—Barnes, Kisselle, Raisch, Choate, Whittemore & Hulbert, P.C.

[57] ABSTRACT

A machine tool module has a platen supported on a track above a metal-removing tool. A workpiece is placed on the platen at a loading station at one end of the track. A drive is provided to move the platen from the loading station to the metal-removing station where the tool removes material from the workpiece and then to an unloading station at the opposite end of the track. After the workpiece is unloaded, the platen is moved back to the loading station. A workpiece loading elevator is provided at the loading station and a workpiece unloading elevator is provided at the unloading station. Two such machine tool modules may be placed end-to-end so that a workpiece on the platen of one module may be transferred to the platen on the other module for machining by both modules in sequence.

21 Claims, 4 Drawing Sheets

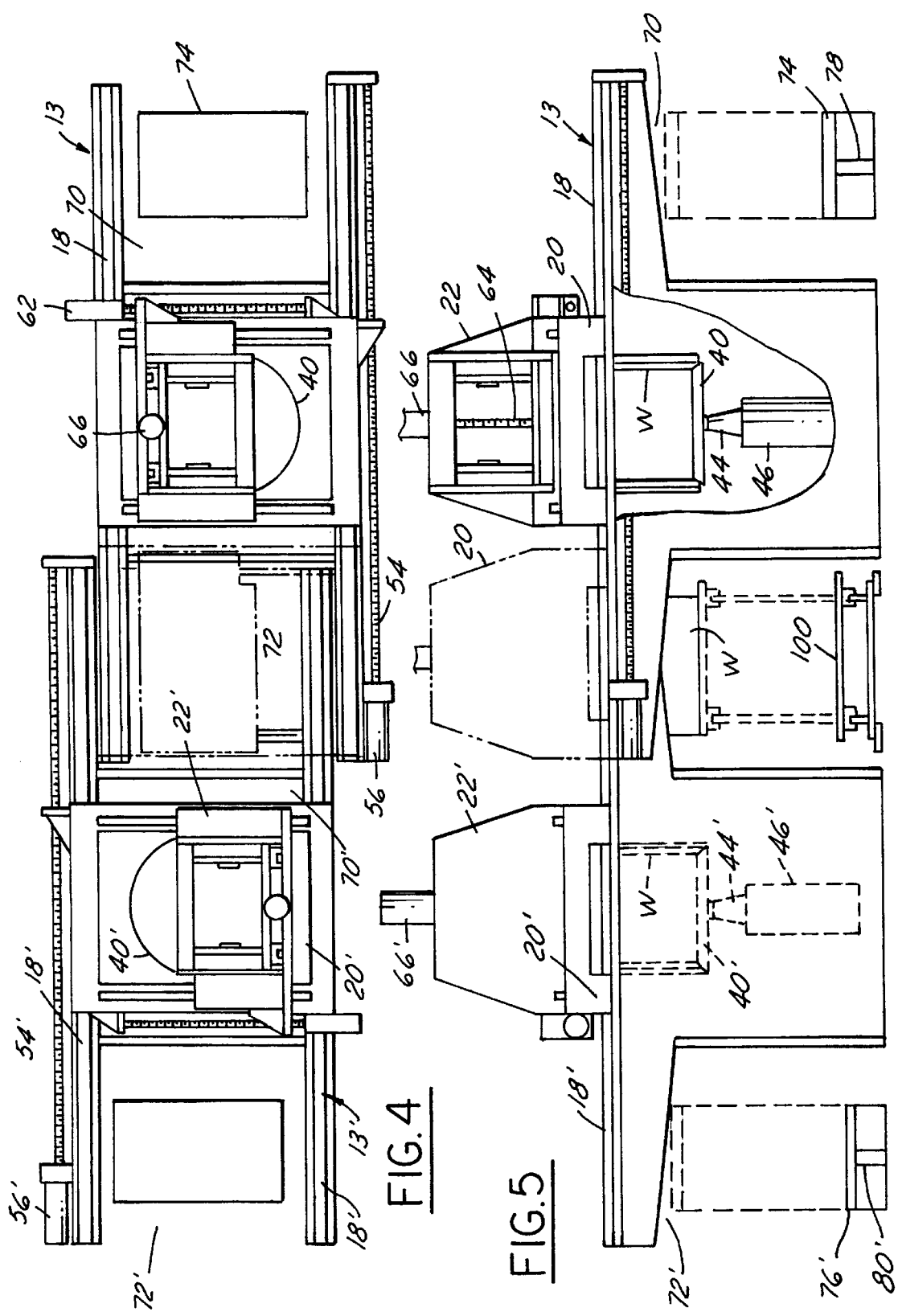

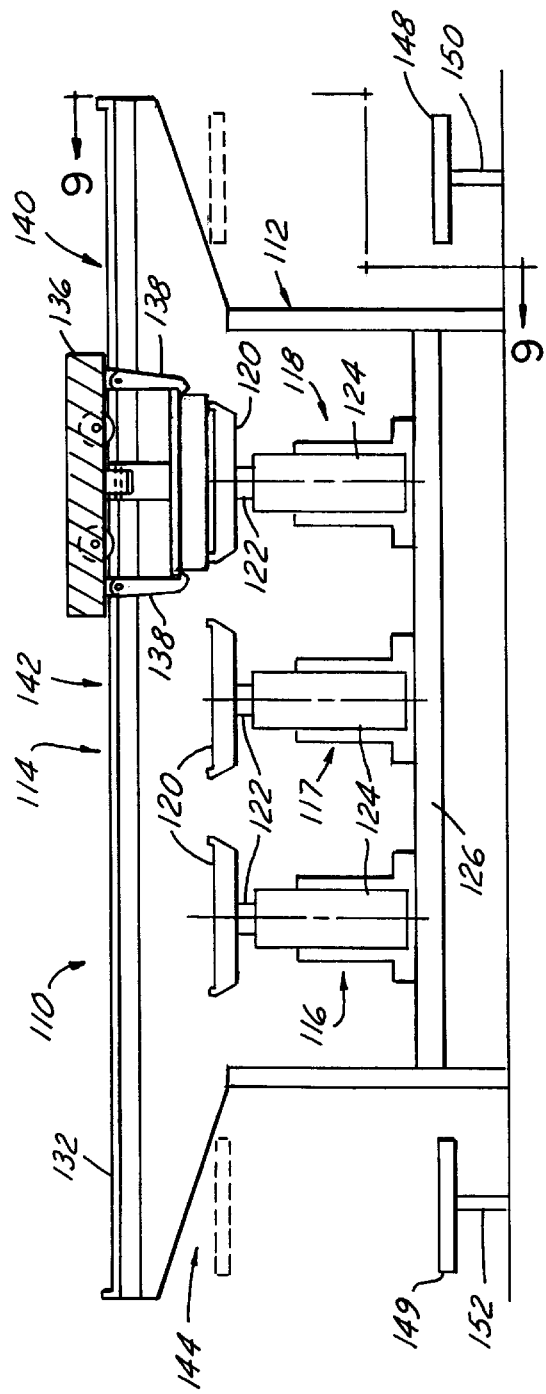
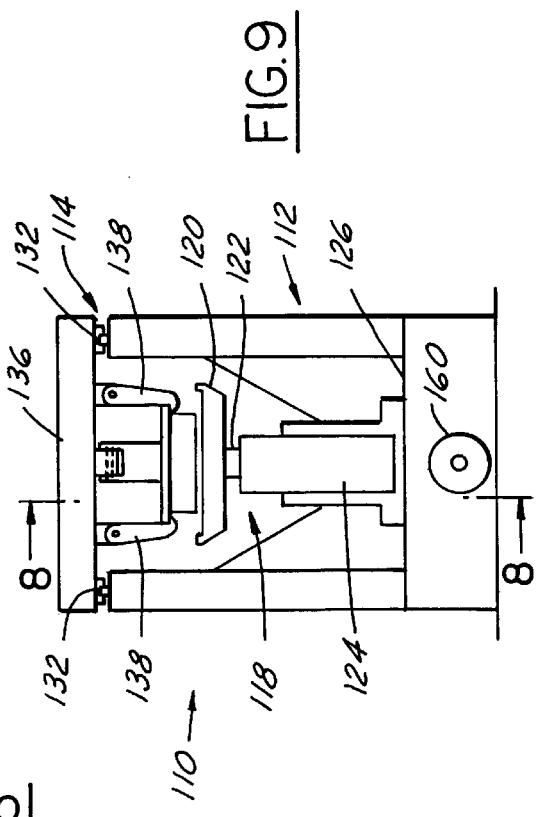
FIG.8
FIG.9

MACHINE TOOL MODULE WITH CUTTING TOOL AND SUPERIMPOSED WORKPIECE-CARRYING PLATEN

FIELD OF INVENTION

This invention relates generally to machine tools and more particularly to a machine tool module having a cutter and a superimposed workpiece-carrying platen.

BACKGROUND OF THE INVENTION

Machines tools are configured much the same as they were many years ago, at a time when it was important for the operator to have easy access to the workpiece. Operator access was considered essential even at the expense of other features, such as machine rigidity and chip flow. In more recent years, programmable controllers have virtually eliminated the need for operator intervention, and yet machine configuration has not changed significantly in the last 50 years. What is needed is a machine tool configuration which offers numerous advantages over traditional machine tool configurations while maintaining high production rates and enabling increased flexibility and rigidity.

SUMMARY OF THE INVENTION

The machine tool module of the present invention comprises a workpiece platen above a metal-removing tool and supported for sliding movement on a track carried by a rigid frame. The platen is moved from a work loading station at one end of the track to a work unloading station at the opposite end. The metal-removing tool is supported beneath the track, preferably in an interior space within the frame, and removes metal from the workpiece at a metal-removing station between the ends of the track.

Preferably, a cross slide is mounted on the platen for movement at right angles to the track, and a workpiece holder is mounted on the cross slide for vertical movement so that machining with three orthogonal axes can be obtained. Separate drives are provided for moving the platen along the track, the cross slide along the platen and the work holder along the cross slide.

Preferably, a workpiece loading elevator is provided at the loading station and a workpiece unloading elevator is provided at the unloading station. Chips of metal removed in the machining operation are preferably removed by a suitable chip clearing device or vacuum unit beneath the platen.

Two such machine tool modules may be placed end-to-end so that a workpiece on the platen of one module may be transferred to the platen of the other module for machining by both assemblies.

The machine of the present invention is extremely rigid and yet portable so that it may be moved from one location to another or arranged in an overlapping relationship with a second module.

One object of this invention is to provide a machine tool module having the foregoing features and capabilities.

Other objects are to provide a machine tool module which has improved chip removal, is composed of a relatively few simple parts, has increased flexibility, portability and rigidity, is capable of high production at lower cost, is rugged and durable in use, and is capable of relatively inexpensive manufacture and assembly.

BRIEF DESCRIPTION OF THE DRAWINGS

These and other objects, features and advantages of the invention will become more apparent as the following description proceeds of the presently preferred embodiment and best mode, especially when considered with the accompanying drawings in which:

FIG. 4 is a top view showing two overlapping machine tool modules so that a workpiece may be machined by the cutting tool of each of the two modules in sequence.

FIG. 5 is a front side view of the two modules shown in FIG. 4.

FIG. 8 is a front view of a machine tool module of modified construction.

FIG. 9 is a view taken on the line 9—9 in FIG. 8.

DETAILED DESCRIPTION

Figure 1:
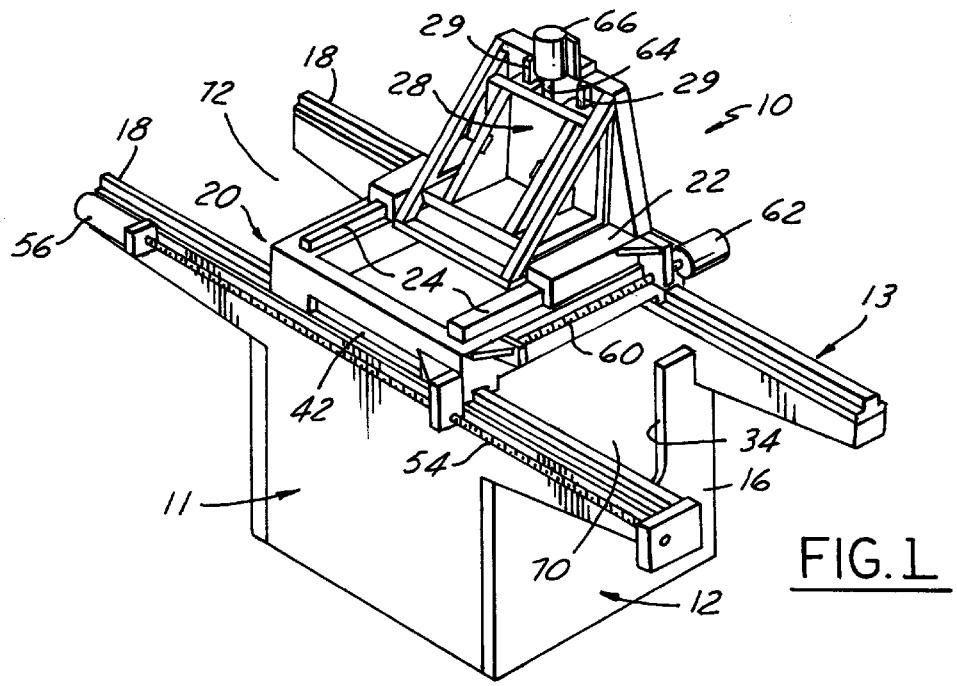
FIG. 1 is a perspective view of a machine tool module embodying the invention, but omitting the elevators preferably provided at opposite ends of the module.
Figure 2:
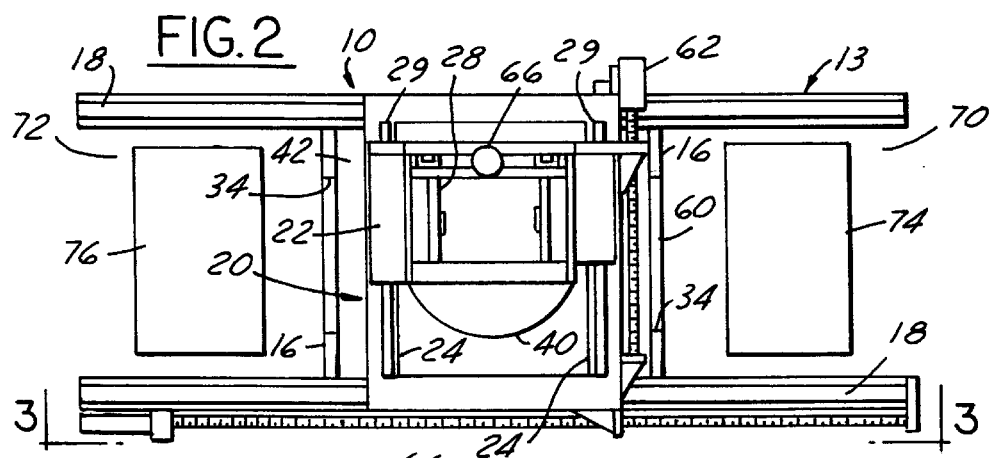
FIG. 2 is a top view of the machine tool module shown in FIG. 1.
Figure 3:
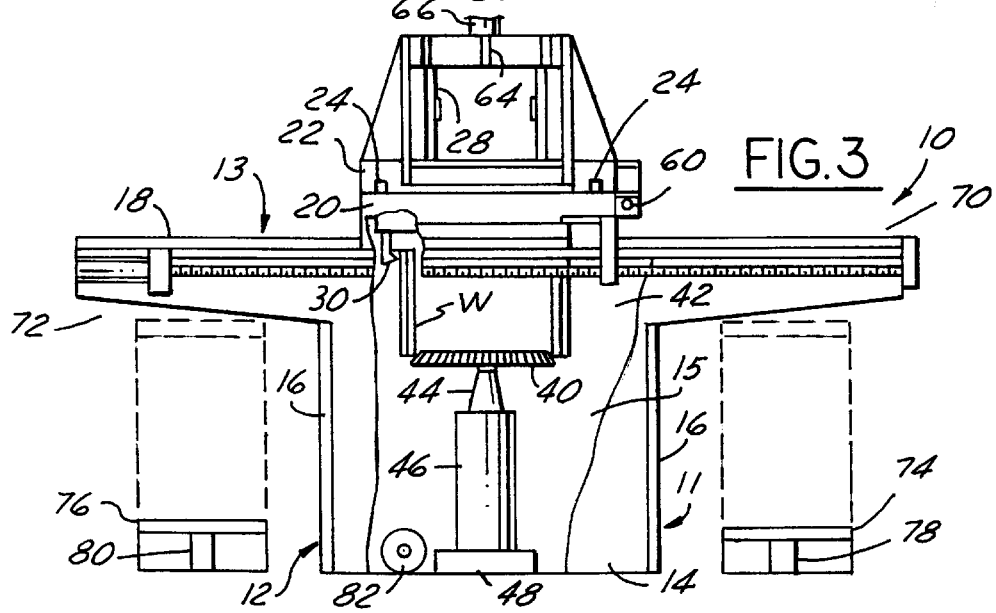
FIG. 3 is a front side view of the machine tool module taken on the line 3—3 in FIG. 2.
Figure 6:
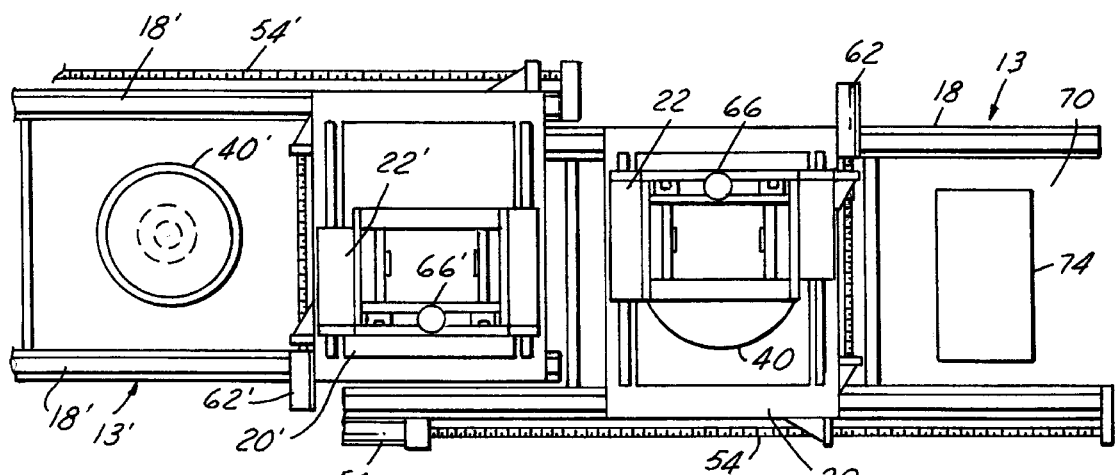
FIG. 6 is a fragmentary top view of the modules shown in FIG. 4, but with the platens of the two modules in different positions.
Figure 7:
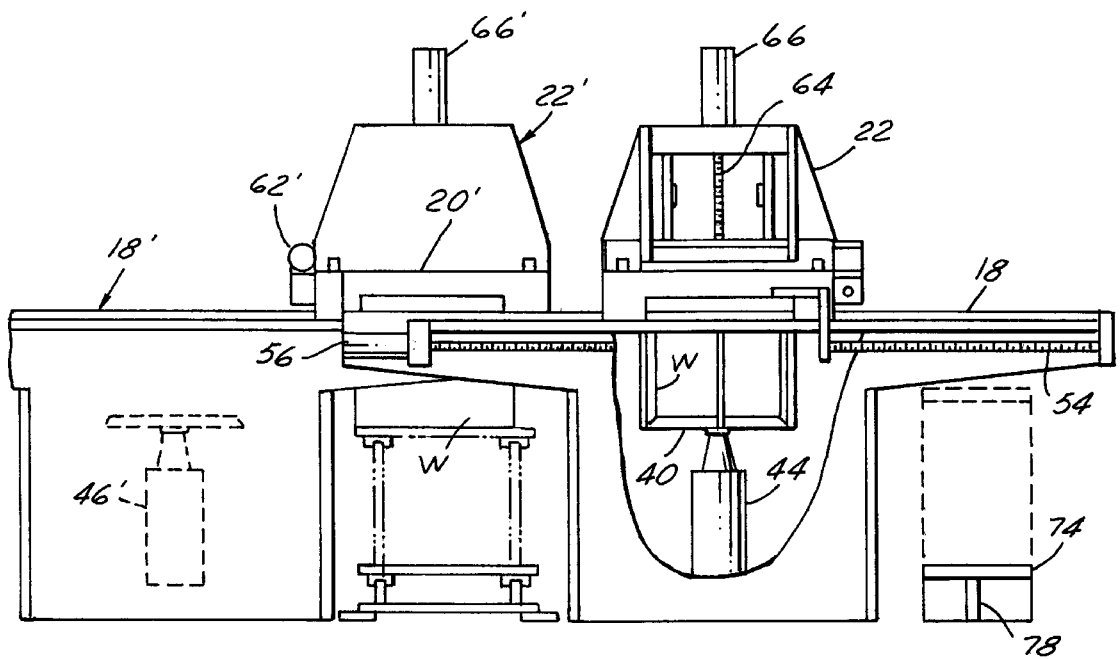
FIG. 7 is a fragmentary front side view of the modules shown in FIG. 6.

Referring in more detail to the drawings and especially to FIGS. 1–3, a machine tool module 10 embodying this invention has a base 11 comprising a rigid, open top, box-like upright frame 12 with a track 13 at the top of the frame. The frame has front, rear and end walls 14,15 and 16, defining a rectangular interior space. The track 13 comprises a pair of elongated laterally spaced-apart generally horizontal, parallel rails 18 mounted on the upper edge of the front and rear walls 14 and 15. The rails extend beyond the frame at both ends.

A platen 20 is mounted on the rails 18 for longitudinal sliding movement. A cross slide 22 is mounted on rails 24 of the platen 20 for transverse horizontal movement in a direction perpendicular to the rails 18. A work holder 28 is mounted on vertical rails 29 of the cross slide 22 for vertical sliding movement. Releasable clamps 30 are provided to clamp a workpiece W to the work holder 28.

The workpiece W is suspended downwardly from the work holder 28. The end walls 16 of the base frame 12 have openings 34 to provide clearance for the workpiece when the platen 20 is moved along the rails 18.

A cutting tool, in this instance a rotatable milling cutter 40, is mounted within the interior space of the frame 12 beneath a metal-removing station 42 which is located midway along the length of the rails 18. The milling cutter 40 is mounted on the upper end of a vertical shaft 44 which projects upwardly from the motor 46. The motor 46 is mounted on a base 48. The height of the cutter does not need to be adjusted vertically, because the height of the workpiece is mounted on the vertically adjustable work holder 28. However, shims could be provided for the motor, if desired, to vary the height of the cutter. The cutter can be removed for repair or replacement through one of the openings 34, or the cutter could be lifted straight up out of the frame 12 when the platen is moved to one end of rails 18 or the other.

The platen 20 is moved from one end of the rails 18 to the other by a ball screw drive 54 powered by a servomotor 56. The cross slide 22 is moved crosswise of the rails 18 by a ball screw drive 60 powered by a servomotor 62. The work holder 28 is moved up and down by a ball screw drive 64 powered by a servomotor 66.

Instead of the ball screw drives for the platen 20, cross slide 22 and work holder 28, other drive systems may be employed, such, for example, as linear motors. The drive system can be closed loop with position and velocity feedback, or open loop with no feedback.

There is a loading station 70 at one end of the rails 18 and an unloading station 72 at the other end of the rails. At the loading station, there is a platform 74 and at the unloading station there is a platform 76. The platforms 74 and 76 are for supporting a workpiece. The platforms 74 and 76 may be stationary or they may be shuttles capable of horizontal movement on suitable tracks to and from the loading and unloading stations. The platforms are shown diagrammatically in FIGS. 2 and 3 as mounted on elevators 78 and 80 capable of vertical movement, but elevators are not required.

If elevators are used, they can be raised and lowered to and from a raised position high enough to reach a workpiece clamped to the work holder. The elevators 78 and 80 are shown in their lower position in solid lines and in their raised position in broken lines. In the raised position of the loading elevator 78, a workpiece on the platform 74 may be clamped onto the work holder 28 by clamps 30. At the unloading station 72, and with the unloading elevator 80 in the raised position, a workpiece may be unclamped from the work holder 28 and deposited on the platform 76 at the top of the unloading elevator.

In instances where the work holder is not capable of vertical movement, the elevators 78 and 80 are particularly useful. In the construction of FIGS. 1–3, where the work holder is capable of vertical movement, the elevators are sometimes omitted and the platform made stationary, because the work holder may be lowered sufficiently to reach a workpiece on the platform or to deposit a workpiece thereon.

Since the workpiece is above the cutter, the chips drop from the workpiece by gravity into the space within frame 12 and are readily removed by a chip screw and/or vacuum unit 82.

The frame 12 enables an extremely rigid and stiff mounting for the machining unit relative to the platen and hence the workpiece.

In use, the platen 20 is moved to the loading station 70 at one end of the rails 18, and the loading elevator 78, with a workpiece to be machined on its platform 74, is elevated to its raised position. Then, the workpiece is clamped to the work holder 28. The cross slide 22 is adjusted transversely. The vertical position of the work holder 28 is adjusted so that the milling cutter 40 will take a desired cut on the workpiece when the platen is moved to the metal-removing station 42. The platen 20 may be stopped at the metal-removing station 42 for metal to be removed from the workpiece, or the platen may be moved continuously across the metal-removing station so that the milling cutter will take the desired cut. For metal to be removed from the workpiece, the platen may also be moved intermittently in the metal-removing station and the workpiece advanced and retracted relative to the milling cutter. For machining the workpiece, the cross slide 22 may also be moved laterally.

When machining is completed, the platen is then moved to the unloading station 72. With the unloading elevator 80 in its raised position, the workpiece may be unclamped from the work holder 28 and deposited on the platform 76 at the top of the unloading elevator 80. The unloading elevator may then be lowered and the workpiece removed, and the platen 20 may be moved back to the loading station 70 to receive another workpiece.

The module 10 is portable and as shown in FIGS. 4–7, may be positioned in overlapping end-to-end relation with a second module of the same construction so that a workpiece partially machined in the first module can be transferred to the second module for further machining. The second module and its parts are designated by the same references as module 10, but primed. For transferring workpieces, the unloading station 72 in the first module 10 is overlapped with the loading station 70' of the second module 10'. A transfer elevator 100 is positioned between the two modules. To transfer a workpiece when the platen 20 on the first module 10 is at its unloading station 72 (broken lines in FIG. 4), the partially machined workpiece is released and deposited on the transfer elevator 100 and then the empty platen 20 of the first module is retracted from the unloading station 72 to the loading station 70. Thereafter, the platen 20' of the second module 10' is moved into its loading station 70' and the transfer elevator 100 is raised to enable transferring the workpiece from the transfer elevator 100 to the platen 20' of the second module 10'. Then the transfer elevator 100 is lowered and the platen 20' of the second module 10' is advanced from its loading station for further machining of the workpiece in the second module 10'.

As stated in the description of FIGS. 1–3, the elevators are sometimes omitted and replaced by stationary platforms especially where the work holder is movable vertically. This is also true in instances where modules are placed end to end, as in FIGS. 4–7.

FIGS. 8 and 9 show a modified machine tool module 110 which is simplified in many respects but which makes provision for two or more cutting tools within the machine frame so that a workpiece may be subjected to machining by the cutters in sequence as it moves from the loading station to the unloading station.

The machine tool 110 has a rigid, open-top, box-like upright frame 112 with a track 114 at the top of the frame. The frame 112 differs from the frame 12 previously described in that it is elongated so that a plurality of cutting tools 116, 117 and 118 can be mounted therewithin. The cutting tools are mounted in spaced apart relation along the length of the interior of the frame and each comprises a cutter 120 mounted on the upper end of a vertical shaft 122 which projects upwardly from a motor 124. The motors are mounted on a base 126 within the frame.

The track 114 at the top of the frame comprises a pair of elongated, laterally spaced apart, generally horizontal, parallel rails 132 which extend lengthwise of the frame. The rails extend beyond both ends of the frame and are mounted on the upper edges of the end walls 134 thereof. A platen 136 is mounted on the rails for longitudinal sliding movement. Releasable clamps 138 mounted on the platen are provided to clamp a workpiece WW to the platen.

The workpiece is suspended from the platen by the clamps and can move along the frame from the loading station 140 across the cutting station 142 to the unloading station 144 without interference with the end walls of the frame as may be seen clearly in FIG. 8. As the platen 136 moves from the loading station to the unloading station, a workpiece clamped thereto will pass over the cutters in succession to be machined by each cutter in sequence. It will be noted that there is a platform 148 on a loading elevator 150 at the loading station and a platform 149 on an unloading elevator 152 at the unloading station. These elevators operate in the same manner as previously described to raise and lower a workpiece on the platform thereof to and from the platen when at one of these two stations. Also, as previously described, the elevators may be eliminated and simple stationary platforms or horizontal shuttles provided. However, because the platen in this instance does not have any provision for raising and lowering the clamped workpiece, elevators are preferred in this embodiment.

Chips drop by gravity into the space within the frame 112 and are removed by a chip screw or vacuum unit 160.

It will be understood that the machine tool module in FIGS. 8 and 9 may be positioned in overlapping end-to-end relation with a second module of the same construction in the same manner as the module 10, so that a workpiece machined in one such module can be transferred to the other for further machining.

What is claimed is:

1. A machine tool module for removing metal from a workpiece, comprising:
   a platen for holding a workpiece,
   a track on which said platen is movably supported,
   a metal-removing tool beneath said track,
   a drive for moving said platen along said track to and from a metal-removing station in which a workpiece held by said platen is located above said tool in a position for the removal of material therefrom by said tool,
   said drive being operable to move said platen along said track to a loading station at one side of said metal-removing station, and
   a workpiece loader at said loading station for delivering a workpiece to said platen,
   said workpiece loader including an elevator mounted for upward movement to a raised position for transfer of a workpiece to said platen from said elevator.

2. A machine tool module as defined in claim 1, and further including a base comprising a rigid frame on which said track is mounted, said frame having side and end walls defining an interior space and said cutter being disposed in said interior space.

3. A machine tool module as defined in claim 1, and further including a device beneath said metal-removing station for receiving and taking away material removed from the workpiece by said tool.

4. A machine tool module for removing metal from a workpiece, comprising:
   a platen for holding a workpiece,
   a track on which said platen is movably supported,
   a metal-removing tool beneath said track,
   a drive for moving said platen along said track to and from a metal-removing station in which a workpiece held by said platen is located above said tool in a position for the removal of material therefrom by said tool,
   said drive being operable to move said platen along said track to a loading station spaced to one side of said metal-removing station and to move said platen along said track to an unloading station spaced to the opposite side of said metal-removing station,
   a workpiece loader at said loading station for delivering a workpiece to said platen,
   a workpiece unloader at said unloading station for removing a workpiece unloaded from said platen,
   wherein said workpiece loader includes a first elevator mounted for upward movement to a raised position for transfer of a workpiece to said platen from said first elevator, and
   wherein said workpiece unloader includes a second elevator mounted for upward movement to a raised position for transfer of a workpiece from said platen to said second elevator and for downward movement from the raised position thereof to a lower position for removal of a workpiece transferred from said platen to said second elevator.

5. A machine tool module as defined in claim 4, and further including a cross-slide supported on said platen for movement transversely of said track, a drive for moving said cross-slide, and a work holder on said cross-slide for holding a workpiece in a vertically adjusted position.

6. A machine tool module as defined in claim 4, and further including a base comprising a rigid frame on which said track is mounted, said frame having side and end walls defining an interior space and said cutter being disposed in said interior space.

7. A machine tool module as defined in claim 6, and further including a device beneath said metal-removing station in said interior space for receiving and taking away material removed from the workpiece by said tool.

8. A machine tool module as defined in claim 4, and further including a cross-slide supported on said platen for movement transversely of said track, a drive for moving said cross-slide, and a work holder supported on said cross-slide for vertical movement and having clamps for holding a workpiece.

9. Apparatus for removing metal from a workpiece comprising two machine tool modules, one of said modules comprising:
   a first platen for holding a workpiece,
   a first rigid frame having a first track for movably supporting said first platen,
   a first metal-removing tool beneath said first track, and
   a first drive for moving said first platen along said first track to and from a first metal-removing station in which a workpiece held by said first platen is located above said first tool in a position for the removal of material therefrom by said first tool,
   the other of said modules comprising:
   a second platen for holding the workpiece,
   a second rigid frame having a second track for movably supporting said second platen,
   a second metal-removing tool beneath said second track,
   a second drive for moving said second platen along said second track to and from a second metal-removing station in which the workpiece when held by said second platen is located above said second tool in a position for removal of material therefrom by said second tool, and
   further comprising a transfer area between said modules where a workpiece on the first platen on said first track may be transferred to the second platen.

10. Apparatus as defined in claim 9, and further including a transfer device at said transfer area for transferring a workpiece on the first platen on the first track to the second platen on the second track.

11. Apparatus as defined in claim 10, wherein said first track has an end adjacent to said transfer device and said second track has an end adjacent to said transfer device.

12. Apparatus as defined in claim 9, wherein said first drive is operable to move said first platen along said first track between said first metal-removing station and a loading station, and said second drive is operable to move said second platen along said second track between said second metal-removing station and an unloading station, a workpiece loader adjacent said loading station for delivering a workpiece to said first platen on said first track, and a workpiece unloader adjacent said unloading station to remove a workpiece unloaded from said second platen on said second track.

13. Apparatus as defined in claim 12, wherein said workpiece loader includes a first elevator mounted for upward movement to a raised position for transfer of the workpiece to said first platen from said first elevator, and wherein said workpiece unloader includes a second elevator mounted for upward movement to a raised position for transfer of the workpiece from said second platen to said second elevator and for downward movement from the raised position thereof to a lower position for removal of the workpiece transferred from said second platen to said second elevator.

14. Apparatus as defined in claim 9, and further including a work holder on each of said platens for holding a workpiece in vertically adjusted position, and a support for each of said tools to mount said tools for rotation about a vertical axis.

15. Apparatus as defined in claim 9, wherein each of said modules has one or more additional metal-removing tools beneath the tracks thereof positioned to remove material from workpieces held by said platens.

16. A machine tool assembly as defined in claim 15, and further including a device beneath each of said metal-removing stations for receiving and taking away material removed from the workpiece by each of said tools.

17. A machine tool module as defined in claim 9, and further including a base comprising a rigid frame on which said track is mounted, said frame having side and end walls defining an interior space and said cutter being disposed in said interior space.

18. A machine tool module as defined in claim 9, and further including a device beneath said metal-removing station for receiving and taking away material removed from the workpiece by said tool.

19. A machine tool module for removing metal from a workpiece, comprising:

a platen for holding a workpiece, a track on which said platen is movably supported, a metal-removing tool beneath said track, a drive for moving said platen along said track to and from a metal-removing station in which a workpiece held by said platen is located above said tool in a position for the removal of material therefrom by said tool, said drive being operable to move said platen along said track to an unloading station at one side of said metal-removing station, and a workpiece unloader at said unloading station for removing a workpiece unloaded from said platen, said workpiece unloader including an elevator mounted for upward movement to a raised position for transfer of a workpiece from said platen to said elevator and for downward movement from the raised position thereof to a lower position for removal of a workpiece transferred from said platen to said elevator.

20. A machine tool module as defined in claim 19, and further including a base comprising a rigid frame on which said track is mounted, said frame having side and end walls defining an interior space and said cutter being disposed in said interior space.

21. A machine tool module as defined in claim 19, and further including a device beneath said metal-removing station for receiving and taking away material removed from the workpiece by said tool.

* * * * *